July 13, 1965   J. H. WOOD   3,194,143
FLUID PRESSURE OPERATED VALVE
Filed April 29, 1963   2 Sheets-Sheet 1

INVENTOR.
JAMES H. WOOD
BY George C. Sullivan
Agent

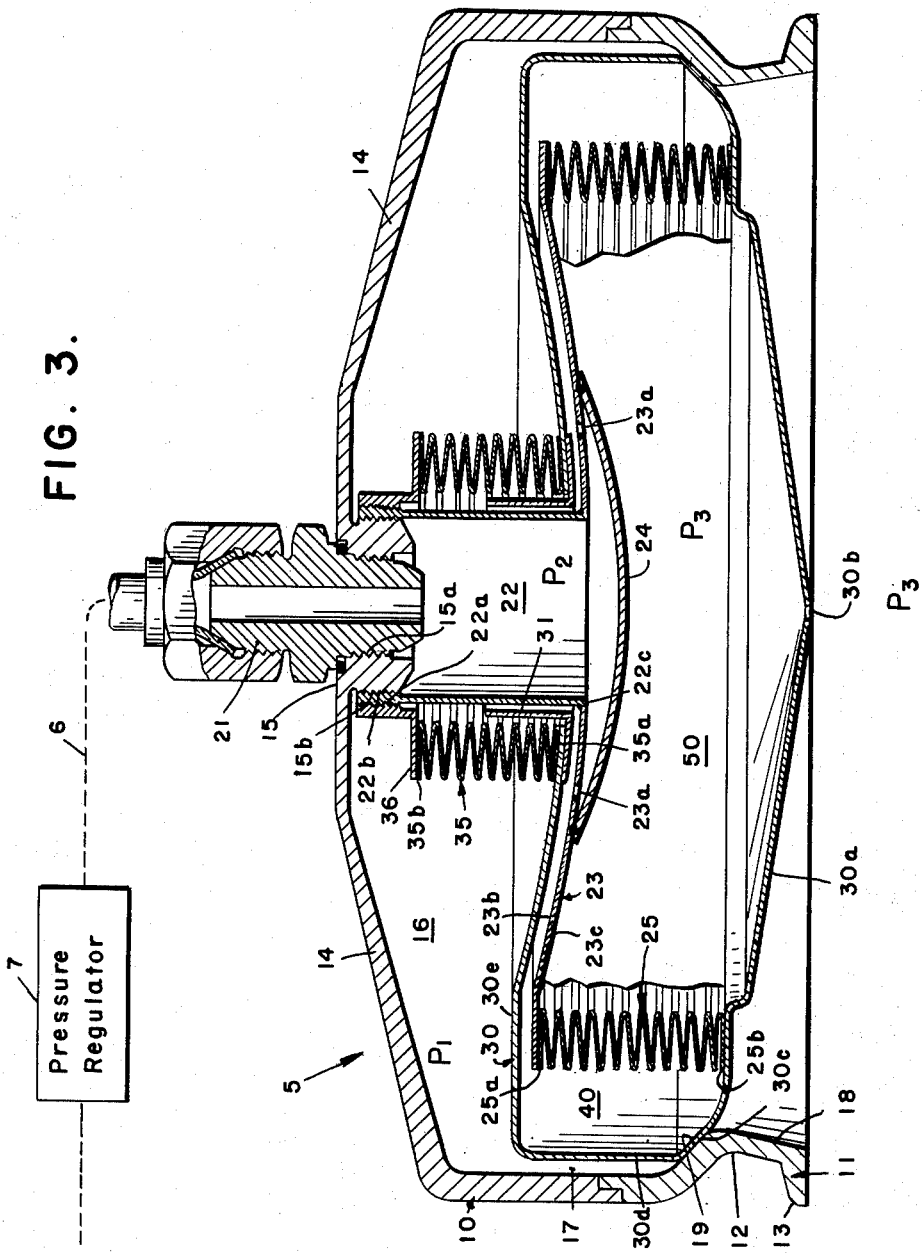

United States Patent Office 3,194,143
Patented July 13, 1965

3,194,143
FLUID PRESSURE OPERATED VALVE
James H. Wood, Marietta, Ga., assignor to Lockheed Aircraft Corporation, Los Angeles, Calif.
Filed Apr. 29, 1963, Ser. No. 276,611
5 Claims. (Cl. 98—1.5)

This invention relates to a fluid pressure operated valve, and more particularly to a differential pressure operated valve.

Aircraft cabins and the like are presently maintained pressurized within a range which provides comfort to the passengers and crew and for the safety of the aircraft cabin structure. Since the atmospheric pressure decreases progressively as the aircraft ascends and increases as the aircraft descends, it is necessary to control the pressure of the cabin air so as to maintain a pressure differential between the cabin air and that of the ambient atmosphere which will provide comfort for the passengers and crew. Thus, cabin pressure may be constant or may be changed at a gradual pre-selected schedule of increase or decrease so that the pressure within the cabin will have reached a value substantially that of the ambient atmosphere pressure at the destination of the flight. As a general rule, pressurized air is supplied to the cabin from a supercharger and the air pressure within the cabin is controlled by an outflow valve disposed in an opening in the wall of the enclosure which is operative to release air from the cabin to maintain a desired cabin pressurization level. Many cabin pressurization outflow valves have been designed in the past and such valves have a tendency to be quite complex in order to obtain a degree of sensitivity, or are sluggish and relatively pressure insensitive.

Accordingly, it is an object of this invention to provide a differential pressure operated valve of simple construction with few operating parts while still sensitive to pressure differentials.

Another object of this invention is to provide a differential pressure operated valve incorporating differential area bellows normally acting in a direction to close the valve in opposition to a control pressure.

Still another object of this invention is to provide a differential pressure operated valve including provisions for controlling and regulating the rate of movement of the valve element.

A further object of this invention is to provide a differential pressure operated valve having a streamlined outflow passage.

Other objects and advantages will become apparent from the following description taken in connection with the accompanying drawings in which:

FIGURE 3 is a partial sectional side view taken along line 3—3 of FIGURE 2.

Generally stated, this invention comprises a fluid pressure operated valve utilizing differential area bellows having predetermined spring rates operating in opposition to a control pressure to bias the valve toward closed position for controlling the pressure in a cabin or an enclosure. The valve also incorporates structure controlling and regulating the opening and closing rate of the valve, thus damping the effects of transient surge conditions.

Figure 1:
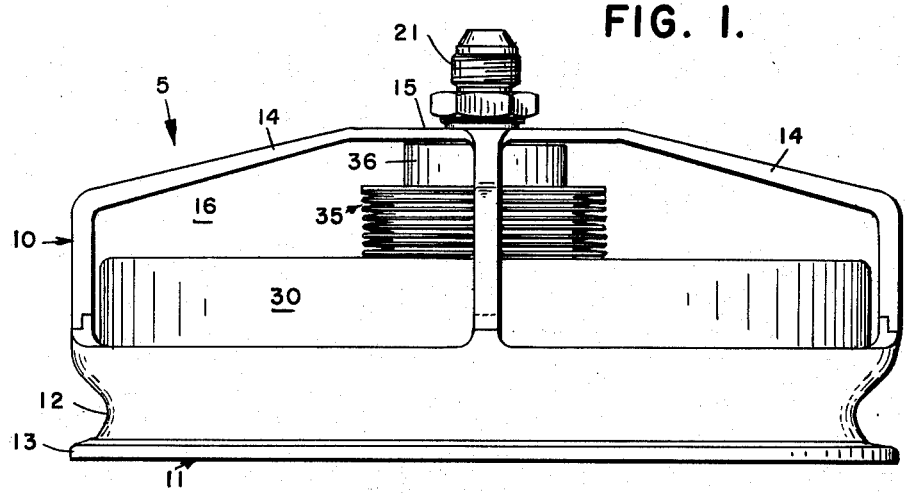
FIGURE 1 is a side elevational view of a differential fluid pressure operated valve embodiment of this invention.
Figure 2:
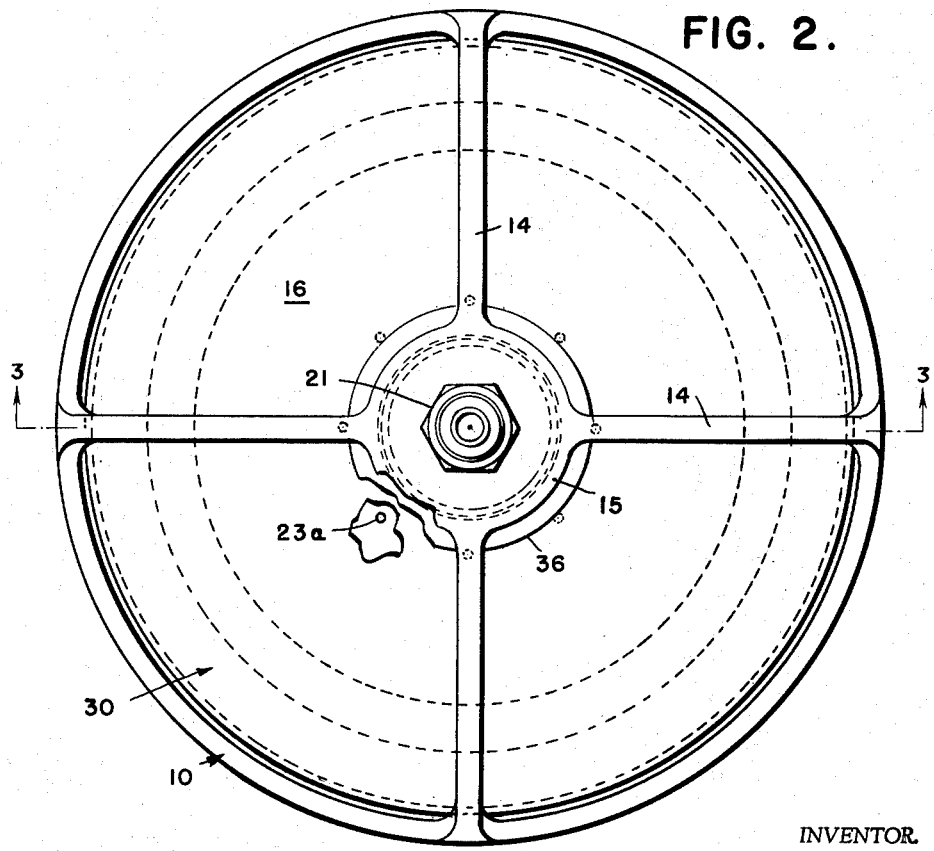
FIGURE 2 is a top plan view of the valve of FIGURE 1.

More specifically, there is shown in FIGURES 1, 2 and 3 a differential pressure outflow valve 5 connected by conduit or line 6 to a control pressure regulator 7. Housing 10 has a reduced annular base 12 provided with an outwardly projecting annular flange 13 for attachment to a cabin wall by any suitable securing means. Four symmetrically related struts 14 extend upwardly and radially inwardly to a boss 15 at one end of the housing. The struts 14 define openings 16 therebetween for the passage of cabin air under a pressure $P_1$ into the interior 17 of the housing and out through the outlet opening 18 in the base 12 thereof when the valve is open, as will presently more clearly appear. It should be noted with regard to the base 12, that interiorly thereof the housing is gently curved at the intersection of the main portion thereof with the reduced annular base 12 to provide the valve seat 19 of smooth aerodynamic design.

The boss 15 is provided with internal screw threads 15a for threaded receipt of the fitting 21 which is connected by line 6 to the pressure control regulator 7 and is provided with external screw threads 15b. A hollow cylindrical center post 22 provided with external screw threads 22a and internal screw threads 22b at its one end is secured by threads 22b to the threads 15b of boss 15. The other end 22c of center post 22 is secured as by welding to a disc 23 having a plurality of bleed holes 23a therein.

A cup-shaped plate 24 is secured as by welding to the center portion of disc 23 in covering relation to the bleed holes 23a so that control pressure fluid from regulator 7 at a pressure $P_2$ will communicate with side 23b of disc 23 in communication with chamber 40 and not side 23c thereof, which is in communication with chamber 50. It will, of course, be appreciated that disc 23 and plate 24 could be constructed structurally integrally, if so desired. One annular end 25a of preferably metallic bellows 25 is secured to the annular peripheral edge of disc 23 and the other annular end 25b thereof is secured to the interior bottom wall 30a of hollow poppet valve element 30. Valve element 30 has an orifice opening 30b in its bottom wall 30a whereby ambient air at a pressure $P_3$ may communicate with chamber 50 and the interior of bellows 25. Bottom wall 30a is contoured at its lower outside peripheral annular edge to form the valve closure portion 30c of complementary configuration to that of valve seat 19. The cylindrical side wall 30d of valve element 30 is spaced apart from the solid annular interior side wall of housing 10, forming space 17 to permit free access of cabin air to the vicinity of the valve seat 19. Valve element 30, it will be seen, surrounds the plate 23 and bellows 25 and has a cylindrical sleeve 31 secured to its top wall 30e in surrounding guided relation to the hollow cylindrical center post 22. A second preferably metallic bellows 35 is secured at its one end 35a to top wall 30e of valve element 30 in surrounding guided relation to sleeve 31 and in concentric relation to bellows 25. The other end 35b of bellows 35 is secured to the bellows support element 36 which is threadably secured to the external screw threads 22a of center post 22. Control pressure air $P_2$ communicates through bleed holes 23a with the exterior of bellows 25 and the interior of bellows 35, while cabin pressure $P_1$ communicates with the exterior of bellows 35. The effective diameters of bellows 25 and 35 define therebetween a work area on the inside of valve element top wall 30e against which the control pressure $P_2$ acts to open the valve 30.

In operation, when pressures $P_1$, $P_2$ and $P_3$ are equal, the combined pre-selected spring rates of bellows 25 and 35 hold the valve element 30 in its closed position on valve seat 19. If pressure $P_2$ is held constant, an increase in pressure $P_1$ in relation to pressure $P_3$ will not change the position of the valve but will act in conjunction with the spring rates of bellows 25 and 35 and pressure $P_2$ to maintain the valve element 30 closed, while an increase in pressure $P_3$ relative to pressure $P_1$ will open the valve when the closing forces of pressure $P_1$ and combined spring rates of bellows 25 and 35 are overcome. Increasing pressure $P_2$ such that it, in combination with pressure $P_3$, exerts a force greater than the combined forces of pressure $P_1$ with bellows 25 and 35 will cause the valve element 30 to move to the open position with the sleeve 31 guiding its movement with respect to center post 32 at a rate determined by the exhaust rate of pressure fluid $P_3$ from chamber 50 through bleed orifice 30b. The purpose of opening valve element 30 is to reduce and thereby regulate the cabin pressure $P_1$. Forclosing the valve element 30, control pressure $P_2$ is reduced to a value such that the combined forces of $P_1$ with bellows 25 and 35 will cause the valve element 30 to move to the closed position at a rate determined by the rate of flow of pressure fluid $P_3$ into chamber 50 through bleed orifice 30b.

The provision of a positive control pressure $P_2$ assures controlled operation of the valve element 30 under all normal conditins of pressure differential between pressures $P_1$ and $P_3$. Further, any failure in the valve, which causes loss of pressure $P_2$, allows the valve element 30 to close. This is an important advantage of the valve of this invention for it precludes the loss of cabin pressure due to failure of the valve or system components which would be extremely hazardous at high altitudes.

It will be seen from the above that the differential pressure operated valve of this invention is constructed and arranged to be controlled by a positive pressure operating against a work area defined by simple concentrically related bellows; includes fail-safe features in that the valve closes upon valve component or system failure; and, includes provisions for regulating the rate of opening and closing of the valve.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A control pressure operated valve for controlling the fluid pressure in a pressurized enclosure equal to or greater than the pressure ambient to the enclosure comprising:
   a valve housing open to the fluid pressure in the enclosure and having an opening in communication with the pressure ambient to the enclosure;
   a valve seat in said housing;
   a hollow and movable valve element located within said housing and having a first wall portion and a second wall portion, said valve element closing said housing opening in communication with the pressure ambient to the enclosure when located on said valve seat;
   a first metallic bellows interconecting the first wall portion of said valve element with said housing and of sufficient length to normally bias said valve element onto said valve seat;
   a second metallic bellows interconnecting the second wall portion of said valve element with said housing and of sufficient length to normally bias said valve element onto said valve seat;
   said second bellows located within said valve element and arranged to define a first and second chamber within sail valve element, said first chamber defined between the first and second bellows and including a part of the interior of said first wall portion of said valve element, said second chamber defined between said second bellows and a part of the interior of said second wall portion of said valve element;
   an opening in said second wall portion of said valve element communicating said second chamber with said pressure ambient to the enclosure; and
   means communicating a control pressure to said first chamber, said control pressure cooperating with said first and second bellows, said pressure ambient to the enclosure and the enclosed pressure to open and close said valve element.

2. A control pressure operated valve for controlling the fluid pressure in a pressurized enclosure equal to or greater than the pressure ambient to the enclosure comprising:
   a valve housing defining a flow passage open to the fluid pressure in the enclosure and having an opening in communication with the pressure ambient to the enclosure;
   a valve seat in said housing;
   a hollow and movable valve element having a first wall portion and a second wall portion located within said housing and closing said housing opening in communication with the pressure ambient to the enclosure when located on said valve seat, said valve element normally biased toward said valve seat by the enclosure fluid pressure;
   a first metallic bellows interconnecting the first wall portion of said valve element with said housing and of sufficient length to normally bias said valve element onto said valve seat;
   a second metallic bellows concentrically related to said first bellows and interconnecting the second wall portion of said valve element with said housing and of sufficient length to normally bias said valve element onto said valve seat;
   said second bellows located within said valve element and arranged to define a first and second chamber within said valve element, said first chamber defined between the interior of the first bellows and the exterior of the second bellows and including a part of the interior of said first wall portion of said valve element, said second chamber defined between the interior of said second bellows and at least a part of the interior of said second wall portion of said valve element;
   an opening in said second wall portion of said valve element communicating said second chamber with said pressure ambient to the enclosure; and
   means communicating a control pressure to said first chamber, said control pressure cooperating with said first and second bellows, said ambient pressure to the enclosure and the enclosed pressure to open and close said valve element.

3. A control pressure operated valve for controlling the fluid pressure in a pressurized enclosure equal to or greater than the pressure ambient to the enclosure comprising:
   a valve housing defining a flow passage open to the fluid pressure in the enclosure and having an opening in communication with the pressure ambient to the enclosure;
   a valve seat in said housing;
   a hollow and movable valve element having a first wall portion and a second wall portion located within said housing and closing said housing opening in communication with the pressure ambient to the enclosure when located on said valve seat, said valve element normally biased toward said valve seat by the enclosure fluid pressure;
   an interior post projecting from said housing in alignment with said flow passage for guiding the movement of said valve element;
   a first metallic bellows in surrounding relation to said post interconnecting the first wall portion of said valve element with said housing and of sufficient length to normally bias said valve element onto said valve seat;
   a second metallic bellows concentrically related to said first bellows and interconnecting the second wall portion of said valve element with said housing and of sufficient length to normally bias said valve element onto said valve seat;
   said second bellows located within said valve element and arranged to define a first and second chamber within said valve element, said first chamber defined between the interior of the first bellows and the exterior of the second bellows and including a part of the interior of said first wall portion of said valve element, said second chamber defined between the interior of said second bellows and at least a part of said second exterior wall portion of said valve element;

an opening in said second wall portion of said valve element communicating said second chamber with said pressure ambient to the enclosure; and means communicating a control pressure to said first chamber, said control pressure cooperating with said first and second bellows, said ambient pressure to the enclosure and the enclosure pressure to open and close said valve element.

4. In a valve:
a movable valve element;
a valve seat;
a first bellows cooperating with said valve element for normally biasing said valve element toward said valve seat;
a second bellows concentricallly related to said first bellow and cooperating with said valve element for normally biasing said valve element toward said valve seat,
said first bellows and said second bellows being positioned so that a chamber is formed comprising a side of said first bellows, an opposite side of said second bellows, and a portion of said valve element;
the diameters of each of said bellows relative to one another being such that a fluid pressure introduced to said chamber produces a force acting on said valve element in opposition to the normal bias applied to said valve element by said bellows; and
means supplying fluid under pressure to said chamber to vary the position of said valve element relative to said valve seat.

5. In a valve:
a valve element;
a valve seat;
a first bellows cooperating with said valve element for normally biasing said valve element toward said valve seat;
means for guiding the movement of said first bellows;
a second bellows concentrically related to said first bellows and cooperating with said valve element for normally biasing said valve element toward said valve seat,
said first bellows and said second bellows being positioned so that a chamber is formed comprising a side of said first bellows, an opposite side of said second bellows, and a portion of said valve element;
the diameters of each of said bellows relative to one another being such that a fluid pressure introduced to said chamber produces a force acting on said valve element in opposition to the normal bias applied to said valve element by said bellows; and
means supplying fluid under positive pressure to said chamber to vary the position of said valve element relative to said valve seat.

References Cited by the Examiner
UNITED STATES PATENTS

| | | | |
|---|---|---|---|
| 2,442,780 | 6/48 | Paget | 98—1.5 |
| 2,477,005 | 7/49 | Paget | 98—105 |
| 2,484,852 | 10/49 | Paget | 98—1.5 |
| 2,510,976 | 6/50 | Herrala | 98—1.5 |
| 2,651,985 | 9/53 | Warstler | 98—1.5 |
| 2,919,102 | 12/59 | Peters | 251—61.1 |

ROBERT A. O'LEARY, *Primary Examiner.*

MEYER PERLIN, *Examiner.*